US 8,837,713 B2

(12) United States Patent
Patil

(10) Patent No.: US 8,837,713 B2
(45) Date of Patent: Sep. 16, 2014

(54) SYSTEMS, METHODS, AND APPARATUS FOR ENABLING AUDIO TRANSMISSION WITHIN A COMMUNICATIONS SESSION

(75) Inventor: Diptesh Patil, Bangalore Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/879,899

(22) PCT Filed: Oct. 27, 2010

(86) PCT No.: PCT/US2010/054304
§ 371 (c)(1),
(2), (4) Date: Apr. 17, 2013

(87) PCT Pub. No.: WO2012/057753
PCT Pub. Date: May 3, 2012

(65) Prior Publication Data
US 2013/0251142 A1    Sep. 26, 2013

(51) Int. Cl.
*H04M 1/00* (2006.01)
*H04M 9/00* (2006.01)
*H04L 5/14* (2006.01)
*H04L 5/16* (2006.01)

(52) U.S. Cl.
CPC ............... *H04L 5/1461* (2013.01); *H04L 5/16* (2013.01)
USPC ..................................... 379/421; 379/202.01

(58) Field of Classification Search
CPC .......... H04B 1/66; H04B 3/20; H04L 5/1461; H04L 5/16
USPC .......... 379/421, 164, 202.01, 388.02, 420.01; 370/260; 455/569.1, 569.2, 416
See application file for complete search history.

(56) References Cited

U.S. PATENT DOCUMENTS 5,191,607 A * 3/1993 Meyers et al. ................ 379/421
5,615,412 A * 3/1997 Doran .......................... 455/222
(Continued)

FOREIGN PATENT DOCUMENTS

| CN | 1115592 | 1/1996 |
|---|---|---|
| CN | 100401733 | 7/2008 |
| CN | 101502012 | 8/2009 |
| DE | 102004040024 | 3/2006 |
| KR | 1020050111402 | 11/2005 |

OTHER PUBLICATIONS

Curtis, M., How Do I Un-Mute My Speaker on My Blackberry 7100i [online]. 2009-2013 eHow Tech. [retrieved on Apr. 11, 2013], Retrieved from the Internet: <http://www.ehow.com/how_5953597_do-un_mute-speaker-blackberry-7100i_.html>.

(Continued)

Primary Examiner — Tuan D Nguyen
(74) Attorney, Agent, or Firm — Benjamin Searle

(57) ABSTRACT

In one embodiment, a communications device joins a full-duplex communications session and disables, at a first time, audio transmission within the full-duplex communications session. The communications device detects, at a second time after the first time, that an audio transmission enable control is in a first state and enables audio transmission within the full-duplex communications session in response to detecting that the audio transmission enable control is in the first state. At a third time after the second time, the communications device detects that the audio transmission enable control is in a second state and disables audio transmission within the full-duplex communications session in response to detecting that the audio transmission enable control is in the second state.

15 Claims, 7 Drawing Sheets

(56) References Cited

U.S. PATENT DOCUMENTS

| | | | |
|---|---|---|---|
| 6,442,272 B1* | 8/2002 | Osovets | 379/406.01 |
| 7,551,940 B2 | 6/2009 | Paulson et al. | |
| 2004/0198425 A1* | 10/2004 | Mellone et al. | 455/553.1 |
| 2006/0172754 A1 | 8/2006 | Shin et al. | |
| 2006/0229093 A1 | 10/2006 | Bhutiani et al. | |
| 2009/0168984 A1 | 7/2009 | Kreiner et al. | |
| 2010/0080374 A1 | 4/2010 | Hepworth et al. | |

OTHER PUBLICATIONS eHow Tech. How to Mute a Cell Phone [online]. 2009-2013 [retrieved on Apr. 11, 2013], Retrieved from the Internet: <http://www.ehow.com/how_4827319_mute-cell-phone.html>.

How to Use Guide The BlackBerry 7100iTM [online], Nextel Welcome Guide. [retrieved on Apr. 11, 2013]. Retrieved from the Internet: <http://shop2.sprint.com/assets/pdfs/en/support/guides/phones/bb7100i/welcome_ug.pdf>.

International Search Report and Written Opinion, Jun. 1, 2011. PCT Application No. PCT/US2010/054304.

English translation (machine-generated) of Abstract from German Patent Publication No. DE-102004040024.

International Preliminary Report on Patentability, May 10, 2013, The International Bureau of WIPO, PCT Patent Application No. PCT/US2010/054304.

* cited by examiner

SYSTEMS, METHODS, AND APPARATUS FOR ENABLING AUDIO TRANSMISSION WITHIN A COMMUNICATIONS SESSION

CROSS-REFERENCE TO RELATED APPLICATION

This application is a U.S. National Stage Application of and claims priority to International Patent Application No. PCT/US2010/054304, filed on Oct. 27, 2010, and entitled "SYSTEMS, METHODS, AND APPARATUS FOR ENABLING AUDIO TRANSMISSION WITHIN A COMMUNICATIONS SESSION".

BACKGROUND

Known mute functionalities that allow communications devices to prevent or inhibit audio transmission (i.e., transmission of audio signals) are often difficult for the users of these devices to operate. For example, the controls that enable and disable mute are frequently located deep within a menu hierarchy of a communications device. Thus, to activate or inactivate a mute functionality of such such a communications device, a user must navigate various menus and to locate mute or unmute option.

Furthermore, mute functionalities are typically implemented as toggle functions. That is, a control is selected to enable a mute functionality and that or a different control is separately selected to disable the mute functionality. The toggle operation of a mute control can be problematic for users. For example, some users often forget to reengage the mute functionality after speaking during a full-duplex communications session. Moreover, if the mute control is inadvertently selected momentarily in the muted state, the communications device toggles to the unmuted state and remains to transmit audio signals until the mute control is again selected to reengage the mute functionality.

As a result, side conversations, background noise, and/or other audio signals can be unintentionally transmitted during a full-duplex communications session. Furthermore, users of communications devices often contend with background noise and unintended interruptions during communications sessions.

DETAILED DESCRIPTION

Figure 1A:
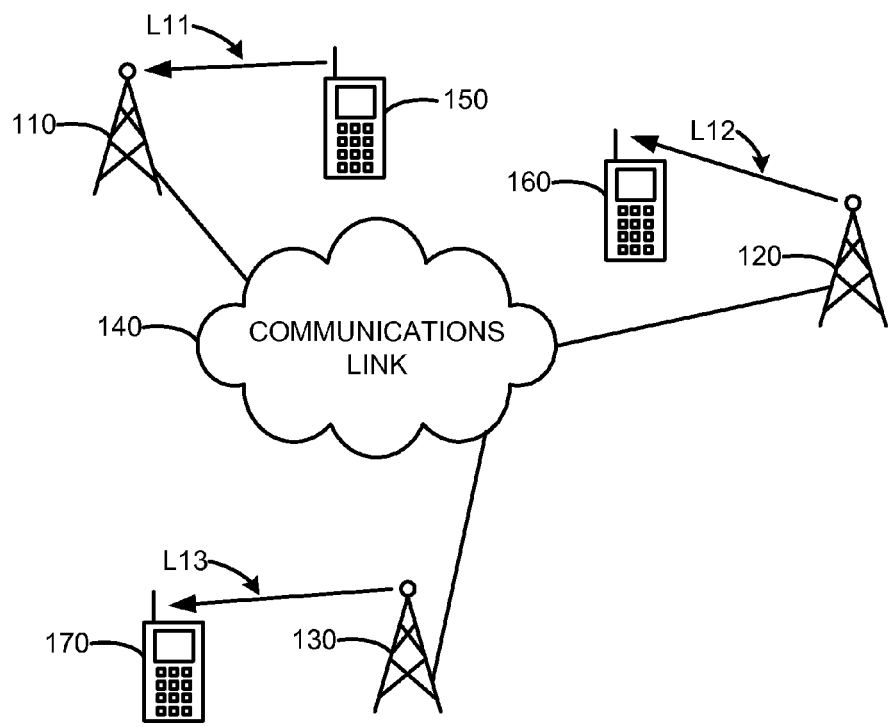
FIGS. 1A and 1B are schematic diagrams of a known half-duplex communications system, according to an embodiment.
Figure 1B:
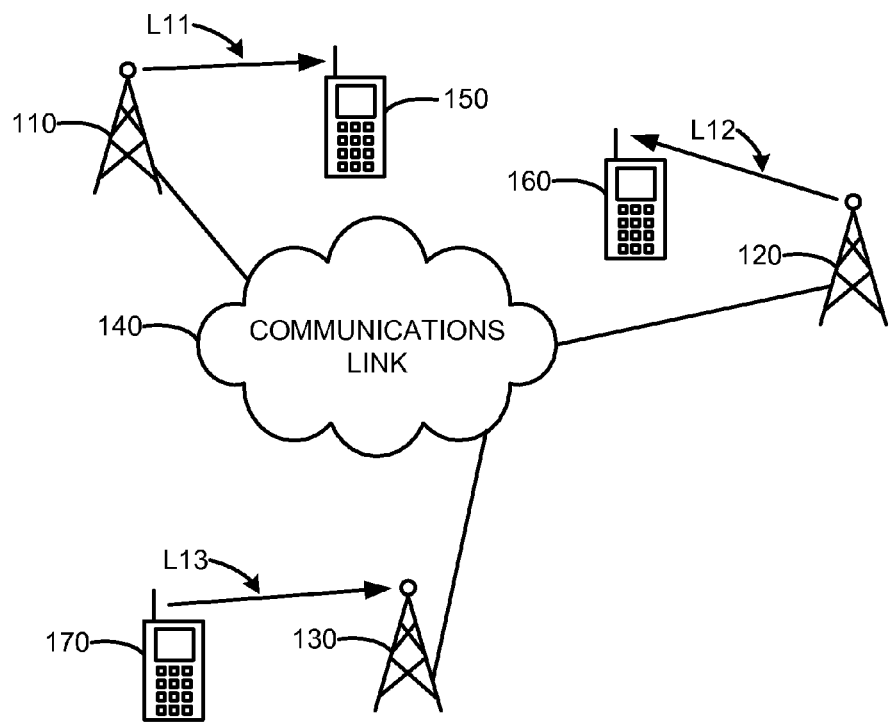

Telephonic communications session (also referred to herein as "communications sessions") are logical connections which allow transmission and reception of audio signals among a group of communications devices such as telephones, cellular telephones, and computing devices (e.g., personal computers, laptop or notebook computers, tablet or slate computing devices, personal digital assistants ("PDAs"), and/or other computing devices). For example, some communications devices host (i.e., store at a memory and execute at a processor) communications session management software modules (also referred to herein as "communications session managers") such as telephony or voice-over Internet Protcol ("VoIP") software applications. Communications sessions can be classified as half-duplex or full-duplex. A communications device associated with a half-duplex communications session can transmit and receive audio signals within the half-duplex communications session, but does not transmit and receive audio signals within the half-duplex communications session simultaneously (or concurrently). In other words, such a communications device does not receive audio signals when it is transmitting audio signals within the half-duplex communications session. Moreover, half-duplex communications sessions typically support (or allow) transmission from only one communications device at any given time. Said differently, a half-duplex communications session supports reception of audio signals at multiple communications devices concurrently, but transmission of audio signals (or audio transmission) from only one communications device at a time. Such communications sessions (and the systems that support or provide such communications session) are typically referred to as push-to-talk ("PTT"). As an example of a half-duplex communications session, FIGS. 1A and 1B are schematic diagrams of a half-duplex communications system, according to an embodiment. FIGS. 1A and 1B illustrate communications devices 150, 160, and 170 and base stations 110, 120, and 130 which are in communication with communications devices 150, 160, and 170, respectively. Base stations 110, 120, and 130 are in communication one with another via communications link 140.

Communications link 140 can include any connector and/or system that allows base stations 110, 120, and 130 to communicate one with another and/or with other computing devices. For example, communications link 140 can be one or more of a cable (e.g., telecommunication cable, twisted-pair cable, coaxial cable, or fiber-optic cable), wireless link or connection (e.g., radio-frequency link, wireless optical link, infrared link, or sonic link), or any other connector or system that supports transmission of communications symbols. Additionally, communications link 140 can include a communications network or combination of communications networks capable of transmitting information (e.g., symbols or signals representing data) such as, for example, an Ethernet network, a fiber-optic network, a switch fabric, a wireless network, an intranet, and/or the Internet.

In some embodiments, communications link 140 can include multiple communications links and/or communications networks operatively coupled one to another by, for example, bridges, routers, switches, hubs, and/or gateways. For example, base station 110 can be operatively coupled to an Ethernet (not shown) and data coherency engine 120 can be operatively coupled to a fiber-optic network (not shown). The cellular network and fiber-optic network can each be operatively coupled one to another via one or more network bridges, routers, switches, and/or gateways such that the cellular network and the fiber-optic network are operatively coupled to form a communications link. Alternatively, the cellular network and fiber-optic network can each be operatively coupled one to another via one or more additional communications networks. For example, the cellular network and the fiber-optic network can each be operatively coupled to the Internet such that the cellular network, the fiber-optic network and the Internet are operatively coupled to form a communications link.

Links L11, L12, and L13 illustrate the flow of information (e.g., audio signals) within a half-duplex communications session supported at the half-duplex communications system of FIGS. 1A and 1B. Because the communications session is half-duplex, each of communications devices 150, 160, and 170 either transmits audio signals or receives audio signals at any time, but does not concurrently transmit and receive audio signals. In FIG. 1A, links L12 and L13 are downlinks from base stations 120 and 130 to communications devices 160 and 170, respectively. Link L11 is an uplink from communications device 150 to base station 110 in FIG. 1A. Thus, FIG. 1A illustrates a time at which device 150 is transmitting audio signals within the half-duplex communications session and communications devices 160 and 170 are receiving the audio signals transmitted by communications device 150 within the half-duplex communications session.

Similarly, FIG. 1B illustrates a time at which device 170 is transmitting audio signals within the half-duplex communications session and communications devices 150 and 160 are receiving the audio signals transmitted by communications device 170 within the half-duplex communications session. That is, in FIG. 1B, links L11 and L12 are downlinks from base stations 110 and 120 to communications devices 150 and 160, respectively, and link L13 is an uplink from communications device 170 to base station 130 in FIG. 1B.

If two of communications devices 150, 160, and 170 attempt to transmit simultaneously (i.e., at the same time) within the half-duplex communications session, the audio signals from the two communications devices interfere one with another. Due to such interference, the resulting audio signal received at the remaining communications devices within the half-duplex communications session cannot be understood. For example, in a two-way radio system such as a Citizen Band ("CB") radio system in which communications devices transmit only when a PTT or transmit button is depressed, only one communications device (i.e., CB radio) can transmit at a frequency at any time. In some embodiments, a half-duplex communications system allows only one communications device to transmit at any time within a half-duplex communications system. For example, a Push-to-Talk over Cellular ("PoC") communications system uses VoIP technologies to implement PTT or half-duplex communications sessions in a cellular telephony system. A controller within the PoC communications system forwards only the data packets representing audio signals from a single communications device within the system that first begins transmitting audio signals until that communications device stops transmitting audio signals. If another communications device attempts to simultaneously transmit data packets representing audio signals within the half-duplex communications session, those data packets are discarded by the controller and not forwarded to the other communications devices.

Figure 2:
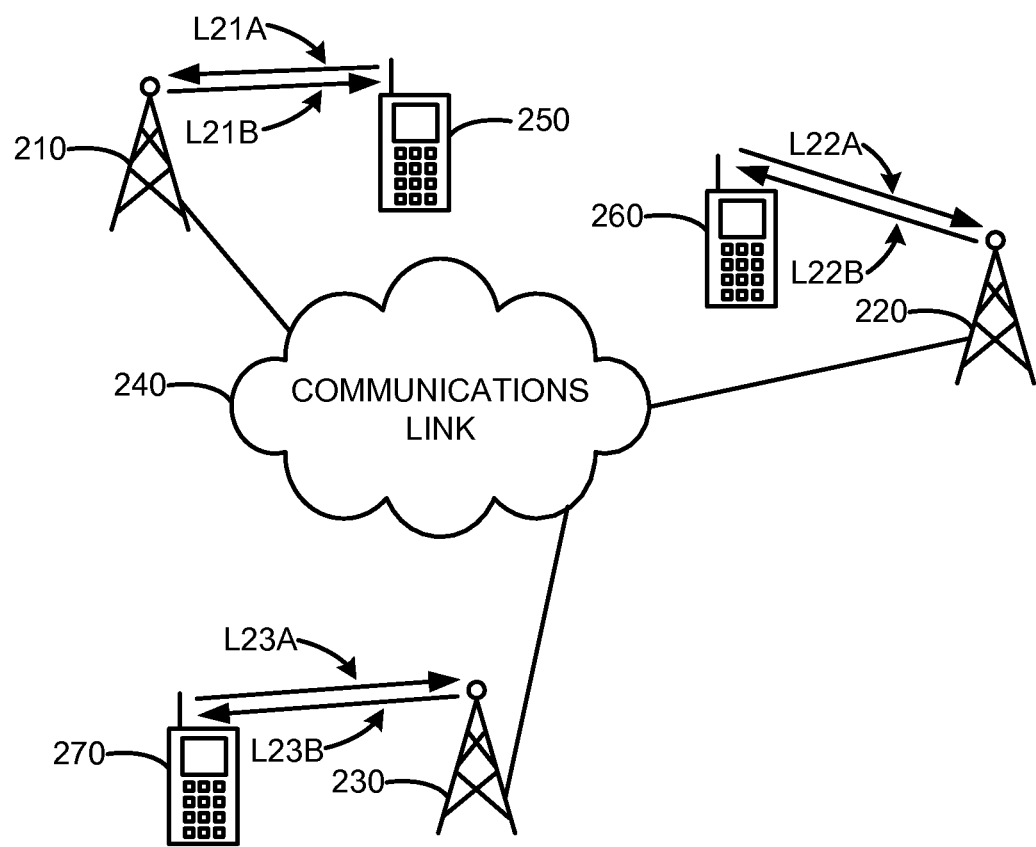
FIG. 2 is a schematic diagram of a full-duplex communications system, according to an embodiment.

A communications device associated with a full-duplex communications session can transmit and receive audio signals within the full-duplex communications session simultaneously (or concurrently). In other words, such a communications device receives audio signals when it is transmitting audio signals within the full-duplex communications session. Thus, a full-duplex communications session supports audio reception and audio transmission concurrently at multiple communications device within the full-duplex communications session. As an example of a full-duplex communications session, FIG. 2 is a schematic diagram of a full-duplex communications system, according to an embodiment. FIG. 2 illustrates communications devices 250, 260, and 270 and base stations 210, 220, and 230 which are in communication with communications devices 250, 260, and 270, respectively. Base stations 210, 220, and 230 are in communication one with another via communications link 240.

Links L21A, L21B, L22A, L22B, L23A, and L23B illustrate the flow of information (e.g., audio signals) within a full-duplex communications session supported at the full-duplex communications system of FIG. 2. That is, links L21A, L21B, L22A, L22B, L23A, and L23B illustrate a logical flow of information within the full-duplex communications session. More specifically, communications devices 250, 260, and 270 can simultaneously transmit audio signals within the full-duplex communications session. Thus, although links L21A, L21B, L22A, L22B, L23A, and L23B can be supported by physical links (not shown) using various physical channel access methodologies that might not allow simultaneous transmission and reception of physical signals, communications devices 250, 260, and 270 can simultaneously transmit audio signals within the full-duplex communications session.

As an example, links L21A, L21B, L22A, L22B, L23A, and L23B can be realized (or implemented) over physical links (not illustrated) using a time division multiple access ("TDMA") channel access methodology in which each of communications devices 250, 260, and 270 is assigned a transmit time period (or slot) and a receive time period (or slot) within a time frame. Although communications devices 250, 260, and 270 each communications device only transmits or receives at any given time (i.e., within an appropriate time slot) over its respective physical link to base stations 210, 220, or 230, respectively, full-duplex communications sessions can be implemented over these physical links because the time periods within a time frame (and the time frame itself) are short and rapidly occur (i.e., the communications devices frequently transmit for a short period of time) and the audio signals transmitted are properly mixed. Thus, a participant (e.g., a user of one of communications devices 250, 260, or 270) within the full-duplex communications sessions may notice a slight delay, but audio transmission and reception are simultaneously enabled for each of communications devices 250, 260, and 270 within the full-duplex communications sessions (i.e., the logical connections or links layered over the various physical links). Other channel access methodologies such as frequency division multiple access ("FDMA") can be used to support separate physical transmission and reception links for communications devices 250, 260, and 270. That is, each of logical links L21A, L21B, L22A, L22B, L23A, and L23B can be realized by a separate physical link.

Half-duplex communications systems are useful for many reasons. Half-duplex communications systems are typically less expensive than full-duplex communications session because audio signals need not be properly mixed and distributed to allow each communications device within a half-duplex communications system to simultaneously without interference. Additionally, communications devices in half-duplex systems do not include transceivers capable of concurrent reception and transmission. Furthermore, half-duplex communications sessions typically do not suffer from the background noise generated at each communications device within the half-duplex communications sessions because only one communications device within a half-duplex communications sessions transmits at any given time.

Full-duplex communications system, however, are often desirable because a full-duplex communications session is similar to face-to-face interaction in which participants can interrupt one another (in a half-duplex communications session any transmitting party is unable to perceive interruptions because the transmission and reception functionalities of the communications devices are mutually exclusive), provide immediate comment (i.e., without waiting for other participants to cease transmission), and does not require coordination of when one participant ends transmitting and another participant begins transmitting (e.g., there is no need to signal an end of transmission by participants using words such as "over" or "out"). However, full-duplex communications sessions suffer from the background noise generated at each communications device within the full-duplex communications session because each communications device within a full-duplex communications session can transmit at any given time.

Although mute functionalities available at many communications devices that are capable of participating in full-duplex communications sessions and systems allow these communications devices to prevent or inhibit audio transmission (i.e., transmission of audio signals), such functionalities are often difficult for the users of these devices to operate. For example, the controls (e.g., options, physical buttons, or soft-buttons) that enable and disable mute are frequently located deep within a menu hierarchy of a communications device. More specifically, for example, the controls to mute and unmute a cellular telephone are often implemented as an option within a menu. Thus, to activate or inactivate a mute functionality of such a cellular telephone, a user must select the menu and then select the mute or unmute option. Furthermore, mute functionalities are implemented as toggle functions. That is, a control is selected to enable a mute functionality and that or a different control is separately selected to disable the mute functionality. Said differently, the control or mute functionality is not biased or is stable in either state.

The toggle operation of a mute control (i.e., a control that toggles between a muted and unmuted state) can be problematic for users. For example, some users often forget to reengage the mute functionality after speaking during a full-duplex communications session. Furthermore, if the mute control is inadvertently selected momentarily in the muted state, the communications device toggles to the unmuted state and remains to transmit audio signals until the mute control is again selected to reengage the mute functionality. As a result, side conversations, background noise, and/or other audio signals can be unintentionally transmitted during a full-duplex communications session.

Embodiments discussed herein provide push-to-talk functionality within full-duplex communications sessions. As a specific example, embodiments discussed herein provide a communication session manager for a communications device which is biased in a state in which audio transmissions from the communications device are disabled (or prevented) within a full-duplex communications session. Thus, audio transmissions from the communications device are enabled (or allowed) only when an audio transmission enable control is manipulated into an unbiased state.

For example, the communications devices of the participants to a conference call (i.e., a full-duplex communications session with more than two participants) can enter a mute-biased state during the conference call and the communications device of the presenter in the conference call can operate a standard communications device. The audio transmission enable control of each communications device in the mute-biased state can be a mechanical button with a depressed state and a released state. Audio transmissions from the communications device of each of the participants is disabled when the button is in the released state, and audio transmissions from that communications device are enabled only when the button is depressed. In other words, audio transmissions are enabled when the button is pressed and disabled when the button is not pressed. Thus, the participants can participate in (i.e., talk during) the conference call by depressing the button of the communications device, speaking while the button is depressed to enable audio transmission, and then release the button to disable audio transmission.

As used in this specification, the singular forms "a," "an," and "the" include plural referents unless the context clearly dictates otherwise. Thus, for example, the term "control" is intended to mean one or more controls or a combination of controls. Additionally, as used herein, the term "module" refers to circuitry and/or software, firmware, programming, machine- or processor-readable instructions, commands, or code that are stored at a memory and executed or interpreted at a processor.

Figure 3:
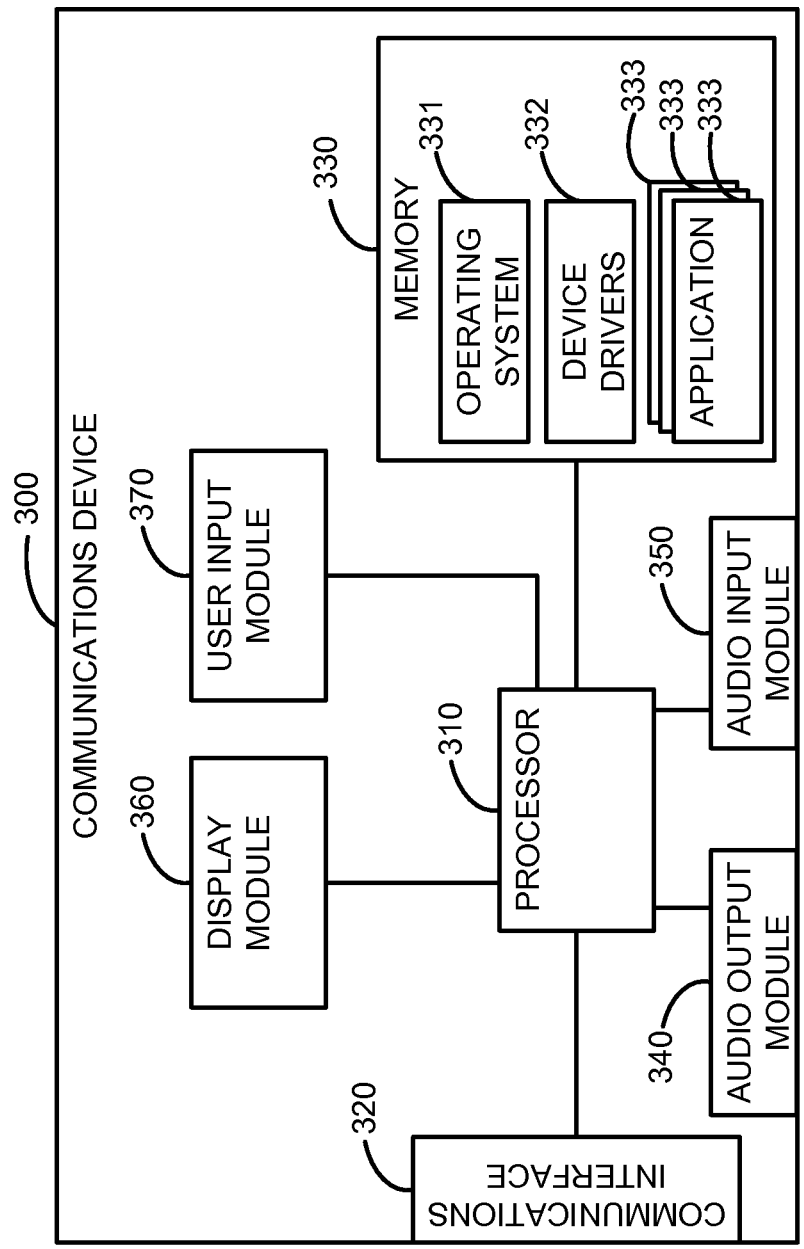
FIG. 3 is a schematic block diagram of a communications device, according to an embodiment.

FIG. 3 is a schematic block diagram of a communications device, according to an embodiment. As illustrated in FIG. 3, computing device 300 includes communications interface 320, processor 310, and memory 330. Processor 310 is operatively coupled to communications interface 320 and memory 330. Typically, as illustrated in FIG. 3, memory 330 includes instructions or codes (e.g., computer codes or object codes) defining software modules that are executed by processor 310 during operation of computing device 310. For example, memory 330 includes instructions that define operating system 331, device drivers 332, and applications 333 (e.g., software application programs). In other words, operating system 331, device drivers 332, applications 333, and other software modules stored as instructions (not shown) at memory 330 and executed at processor 310 are hosted at computing device 300. Applications 333 can include, for example, an application module, a hypervisor, a virtual machine module, and/or an environment such as a runtime environment and/or virtual machine instance.

Memory 330 can include volatile memory such as static random access memory ("SRAM") and/or dynamic random access memory ("DRAM") and nonvolatile memory such as magnetic media (e.g., a hard disk drive), optical media (e.g., a compact disc ("CD") and/or a digital video disc ("DVD")), solid-state media (e.g., a USB FLASH memory device), and/or other processor-readable media. For example, nonvolatile memory can be used as long-term storage for operating system 331, device drivers 332, applications 333, data files (not shown), and/or other software modules stored as instructions (not shown), and operating system 331, device drivers 332, applications 333, data files (not shown), and/or other software modules stored as instructions (not shown) can be loaded into volatile memory for execution at processor 310.

Communications interface 320 is an interface accessible to processor 310 to communicate with (i.e., transmit symbols representing data to and receive such symbols from) other processors and/or computing devices via a communications link. In other words, communications interface 320 can receive data from processor 310 and transmit symbols representing that data via a communications link. Moreover, communications interface 320 can receive symbols from other communications interfaces via a communications link and send data represented by those symbols to processor 310. For example, communications interface 320 can be a telephone network interface, a twisted-pair network interface, a coaxial network interface, a fiber-optic network interface, a wireless network interface such as a wireless local area network ("WLAN") or a cellular network, and/or some other network or communications interface.

Audio output module 340 is a hardware module, software module hosted at a communications device 300, or combination thereof that receives signals including audio information (e.g., from processor 310) and outputs those audio signals aurally. For example, audio output module 340 can include a software driver, an audio amplifier, and a speaker. Similarly, audio input module 350 is a hardware module, software module hosted at communications device 300, or combination thereof that receives aural signals and provides signals representing those aural signals to processor 310. For example, audio input module 350 can include a microphone, an audio amplifier, and a software driver. As another example, audio output module 340 can include a data transmission module that sends audio signals to a reception module and audio input module 350 can include a reception module that receives signals representing aural signals. More specifically, for example, audio output module 340 and audio input module 350 can include a Bluetooth® software stack and transceiver module in communication with a headset including a speaker and a microphone.

Display module 360 is a hardware module, software module hosted a communications device 300, or combination thereof that outputs information visually. For example, display module can include a display driver and a display screen. User input module 370 is a hardware module, software module hosted at a communications device 300, or combination thereof that receives input from a user. For example, user input module 370 can include a keypad, buttons, rotary switches, touch-sensitive sensors, proximity sensors, and/or other devices or controls that can receive or interpret input from a user.

In some embodiments, display module 360 and user input module 370 can be at least partially integrated. For example, communications device can include a touch-sensitive (or proximity-sensitive) display that can display information visually to a user and receive input from the user when the user touches the touch-sensitive display. Thus, user input controls (e.g., virtual buttons, slide controls, rotary controls, etc.) can be displayed at the touch-sensitive (or proximity-sensitive) display and can be selected or manipulated when the user touches or moves proximally to (e.g., with a finger or some instrument or object) the area of the display at which the controls are drawn (or represented). As another example, a soft control or button can be displayed at display module 360 and selected by manipulation of a control such as a physical button at user input module 370. That is, an area of a display of display module 360 can describe a variable functionality of a physical button of user input module 370. In one context (e.g., during a telephone call) that area of the display can include the word "join" to indicate that a conference call will be initiated when the related control (here, the physical button) is selected (or pressed). In another context, (e.g., during a game), the area of the display can include the word "exit" to indicate that the game will be terminated when the related control is selected. Such controls can be referred to as virtual controls (e.g., virtual buttons, slide controls, rotary controls, etc.).

In some embodiments, communications device 300 includes more or fewer components or elements than those illustrated in FIG. 3. For example, a simple telephone can be a communications device and not include memory 330 and display module 360.

Figure 4:
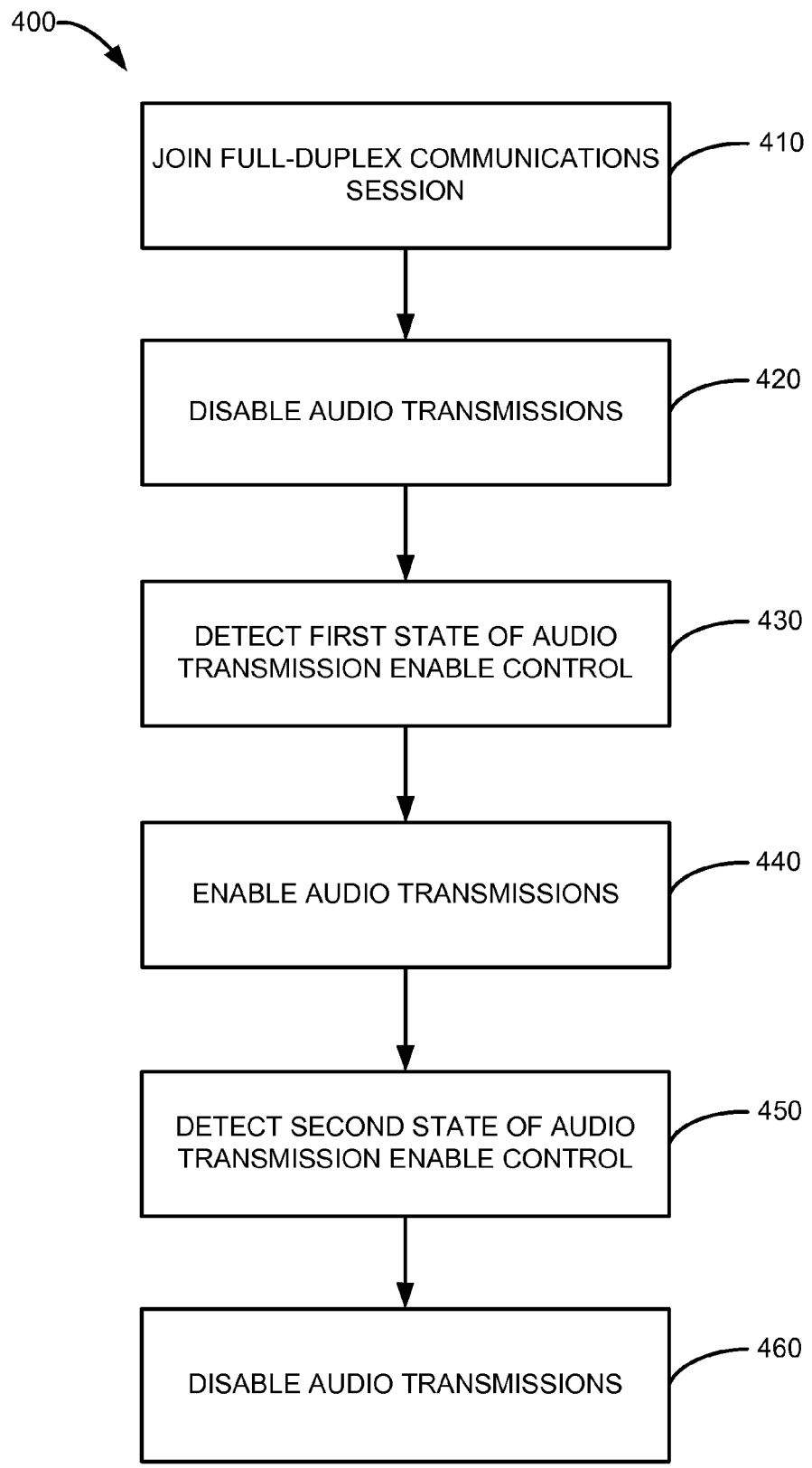
FIG. 4 is a flowchart of a process to control audio transmission at a communications device, according to an embodiment.

FIG. 4 is a flowchart of a process to control audio transmission at a communications device, according to an embodiment. Process 400 can be implemented as a hardware module, as a software module hosted at a computing device, and/or as a combination of a hardware module and a software module. For example, process 400 can be implemented as application-specific circuitry or as a software module including instructions stored at a memory and executed at a processor in communication with the memory. More specifically, for example, process 400 can be implemented at a communications device within a full-duplex communications session.

A full-duplex communications session is joined at block 410. For example, a communications device can answer a telephone call or join (or be joined to) a conference call. Alternatively, for example, a communications device can initiate a communications session (e.g., place a telephone call) to join the communications session. As used herein, the term "join" is intended to apply to each participant (or communications device) of a communications session such as a two-party telephone call or a multi-party conference call. That is, the term "join" is intended to refer to initiation of a communications session and to connecting to a previously initiated communications session. Said differently, in a two-party telephone call (a communications session), both the communications device of the calling party (or participant) and the communications device of the called party (or participant) join the communications session.

A full-duplex communications session, as discussed above, is a communications session in which simultaneous transmission and reception are supported at the communications devices included within (or joined to) the communications session. In other words, a full-duplex communications session provides the experience of a traditional telephone call in which all communications devices (e.g., telephones) within the full-duplex communications session can send and receive audio signals simultaneously within full-duplex communications session.

Audio transmission from the communications device is disabled at block 420. For example, the communications device can determine or detect based on telephony signals such as signals within a communications system implementing Signaling System #7 ("SS7") that the communications device has joined a communications session. As a specific example, the communications device can determine based on telephony signals that the communications device has joined a conference call and audio transmissions at the communications device can be disabled in response to this determination.

Alternatively, for example, audio transmission can be disabled in response to input from a user. For example, after the communications device has joined the full-duplex communications session, the user of the communications device can initiate a disable audio transmission state or functionality of the communications device by manipulating a control of the communications device. In yet other embodiments, the user can set or changed an option (or mode of operation) at the communications device via one or more controls to enable or disable the audio transmission state of the communications device automatically when the communications device detects that a communications session has been joined, or to enable or disable the audio transmission state of the communications device manually when the user manipulates (or selects) a control of the communications device after a communications session has been joined.

Audio transmission (or audio transmission) can be disabled by, for example, causing an open circuit in an electrical path between an audio input module and a communications interface. For example, audio transmission can be disabled (or inhibited) by opening a switch or disabling a transistor within an electrical path between an audio input module and a communications interface. Alternatively, for example, an amplifier within an electrical path between an audio input module and a communications interface can be disabled or the amplification at the amplifier reduced such that aural signals received from the audio input module are inaudible within the full-duplex communications session. As yet another example, a processor can be configured to not sample aural signals at an audio input module or to discard sampled aural signals such that no audio transmissions including the sampled audio signals (or information derived therefrom) is are provided to the full-duplex communications session.

At block 430, audio transmissions from the communications device are disabled, but audio reception is enabled such that a user of the communications device can hear audio transmissions from another communications device (or devices) within the full-duplex communications session. Although audio transmissions from the communications device are disabled at block 430, the communications device can send any information (e.g., telephony or other signals as defined by a telephony or other protocol) to maintain the full-duplex communications session or participation of the communications device within the full-duplex communications session. In other words, aural signals received at an audio input module of the communications device are not transmitted by the communications device within the full-duplex communications session, but other signals can be transmitted by the communications device within the full-duplex communications session. Said differently, the communications device is muted within the full-duplex communications session at block 430.

While audio transmissions are disabled, the first state of an audio transmission enable control is detected at block 430. An audio transmission enable control is a hardware module, a software module hosted at the communications device, and/or a combination thereof. That is, the audio transmission enable control is a hardware and/or software control that has states (or conditions or values) that define whether audio transmission should be enabled. Moreover, the audio transmission enable control can be biased in one state (a biased state) such that the audio transmission enable control is in the biased state absent some external stimulus (or selection) of the audio transmission enable control. For example, an audio transmission enable control can be a normally-open (or biased open) momentary switch (or button) of a communications device. The first state of the switch can be the closed state (or condition) of the switch and a second state can be the open (or biased) state of the switch. Alternatively, the open state can be referred to as the closed state and the closed state can be referred to as the second state. The first state and second state can be detected, for example, by accessing (or reading) an interface (e.g., a general purpose input/output pin) of a processor operatively coupled to the audio transmission enable control. That is, signals associated with the first state and second state and/or transitions between the first state and the second state can be detected at the processor via the interface. Alternatively, for example, the first state and second state and/or transitions between the first state and the second state can be detected as interrupt signals at the processor.

As another example, an audio transmission enable control can be a control displayed at a touch-sensitive (or proximity-sensitive) display of the communications device that is biased in one state. Such a control can be referred to as a virtual control. That is, a first signal associated with a first state of the control is generated when the control is selected (e.g., by touching or moving an object within a proximity to the control) and a second signal associated with a second state of the control is generated when the control is deselected (e.g., by releasing or breaking contact with or moving the object outside the proximity). Thus, the control is in the first state when actively selected and in the second state when the control is not actively selected. As discussed above, the terms first and second are relative one to another and can be reversed. That is, the first state can be when the control is not actively selected and the second state can be when the control is actively selected.

As yet another example, an audio transmission enable control can be a control at an accessory of the communications device. For example, the audio transmission enable control can be a button such as a touch- or proximity-sensitive button at a headset including a microphone and a speaker in communication with the communications device. As a specific example, they audio transmission enable control can be a button at a Bluetooth™ headset paired with the communications device.

The signals associated with states or the transitions between the states of the audio transmission enable control can be electrical, optical, sonic, or other signals. Moreover, the signals can be detected or interpreted as edge- or level-triggered signals. For example, the signals can be digital electrical signals generated at a physical momentary switch. As another example, the signals can be the values of one or more variables within a software module that is initialized to a particular value when the software module is loaded or instantiated at a memory and a processor or during an initialization routine or process of the software module. The state of the audio transmission enable control can be detected by accessing the value of the variable. For example, the variable can be compared with or tested against a predetermined value resulting in a true value if the audio transmission enable control is in a first state (e.g., has one value) and a false value if the audio transmission enable control is in a second state (e.g., has a different value).

As yet another example, the signals can be associated with a subroutine or function within a software module stored at a memory and hosted at a processor. The subroutine signals one state (a first state) of the audio transmission enable control when the subroutine is called, invoked, and/or executing at the processor. The subroutine signals another state (a second state) when the subroutine exited (or returned from). For example, the first signal can be generated and the first state detected (e.g., by the processor) when an operational code (or opcode) related to calling or jumping to the subroutine is interpreted at the processor (or a virtualized operational environment such as a Java™ Virtual Machine). The second signal can be generated at the second state detected when an opcode related to returning from or exiting the subroutine is interpreted the processor (or a virtualized operational environment such as a Java™ Virtual Machine).

Moreover, signals related to states or the transitions between the states of an audio transmission enable control can be, for example, synchronous or asynchronous signals, events, or synchronization objects within a software module hosted at a computing device. For example, POSIX-compliant signals can be used to signal states or the transitions between the states of an audio transmission enable control. Similarly, changes in values or states of events or synchronization objects that can be waited on or used to synchronize software modules (or processing or execution units such as threads within software modules) hosted at a computing device can be signals related to states or the transitions between the states of an audio transmission enable control.

Audio transmission (or audio transmission) can be enabled by, for example, closing an open circuit in an electrical path between an audio input module and a communications interface. For example, audio transmission can be enabled by closing a switch or enabling a transistor within an electrical path between an audio input module and a communications interface. Alternatively, for example, an amplifier within an electrical path between an audio input module and a communications interface can be enabled or the amplification at the amplifier increased such that aural signals received from the audio input module are audible within the full-duplex communications session. As yet another example, a processor can be configured to sample aural signals at an audio input module or to provide sampled aural signals (or information derived therefrom) is to the full-duplex communications session.

As illustrated in FIG. 4, the first state of the audio transmission enable control is associated with enabled audio transmission within the full-duplex communications session at the communications device, and the second state of the audio transmission enable control is associated with disabled audio transmission within the full-duplex communications session at the communications device. Thus, in the context of FIG. 4, the audio transmission enable control is biased in the second state. That is, the audio transmission enable control is in the second state when the audio transmission enable control is not actively selected.

In some embodiments, the audio transmission enable control can include hysteresis. Thus, transmissions between the first state and the second state of the audio transmission enable control can experience a delay after selecting or deselecting (e.g., releasing), respectively, the audio transmission enable control. For example, a transition from the second state to the first state can be nearly immediate (i.e., only system delays such as signal interpretation, processing, and propagation and device switching times prevent a truly immediate transition), and a transition from the first state to the second state can be delayed for a period of one-half of a second to prevent a final word of a user not being transmitted due to premature release of the audio transmission enable control.

In response to detecting the first state of the audio transmission enable control at block 430, audio transmissions are enabled within the full-duplex communications session at block 440. Thus, the communications device transmits within the full-duplex communications session audio information based on aural signals received from an audio input module of the communications device. In other words, audio transmissions are no longer inhibited. Said differently, the communications device is unmuted at block 440.

The second state of the audio transmission enable control is detected at block 450. As discussed above, as illustrated in FIG. 4, the audio transmission enable control is biased in the second state. Thus, the second state of the audio transmission enable control is detected after the audio transmission enable control is no longer actively selected. As a specific example, the second state of the audio transmission enable control is detected at block 450 when a physical momentary switch of the communications device that was depressed between block 420 and block 430 (i.e., the first state of the audio transmission enable control was detected at block 430 in response to the physical momentary switch being depressed) is release. In other words, the audio transmission enable control can be in the second state before block 430 and the first state is detected at block 430 in response to a transition of the audio transmission enable control from the first state to the second state. The complementary transition of the audio transmission enable control from the second state to the first state is detected at block 450. Said differently, the transition of the audio transmission enable control to the second state detected at block 450 is the complementary transition to the prior transition of the audio transmission enable control from the second state to the first state. That is, the complementary transition is the transition from the unbiased state to the biased state. Audio transmissions at the communications device within the full-duplex communications session are disabled at block 460 in response to the detecting the second state at block 450. Thus, the communication device ceases transmitting audio information related to aural signals received at an audio input module of the communications device within the full-duplex communications session.

Process 400 can include blocks in addition to those illustrated in FIG. 4. Additionally, one or more blocks can be rearranged. For example, as discussed above, a delay can be inserted between blocks 430 and 440 and/or between block 450 and 460. As another example, process 400 can include a block at which a user of the communications devices selects or designates a control of the communications device as the audio transmission enable control. That is, the user can designate a control such as a button of the communications device or of an accessory such as a headset in communication with the communications device to be or function as the audio transmission enable control. As a specific example, a communications device can include a volume button on a peripheral side of the communications device and a keypad on a front side (or face) of the communications device that is adjacent to the face of a user of the communications device when the user is participating in a full-duplex communications session using the communications device. The user can select (or designate), using a user interface of the communications device, the volume button to function as the audio transmission enable control rather than a button from the keypad when a conference mode is active at the communications device. This can provide the user with easier access to the audio transmission enable control than if one of the buttons of the keypad were the audio transmission enable control. Furthermore, although process 400 is discussed above with reference to an example environment within a full-duplex communications session, process 400 is applicable within other environments.

Figure 5:
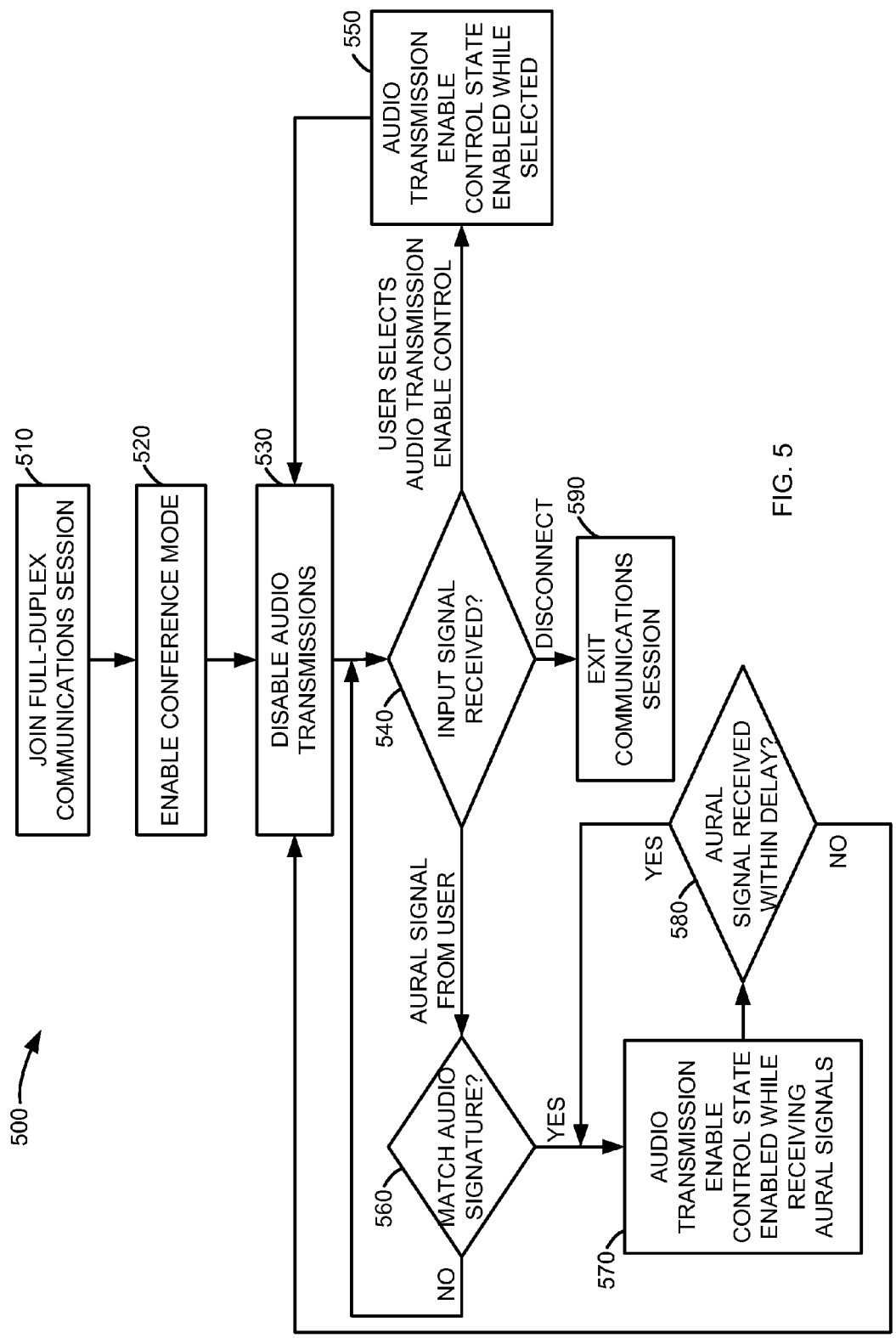
FIG. 5 is a flowchart of a process to control audio transmission at a communications device, according to another embodiment.

FIG. 5 is a flowchart of a process to control audio transmission at a communications device, according to another embodiment. Process 500 can be implemented as a hardware module, as a software module hosted at a computing device, and/or as a combination of a hardware module and a software module. For example, process 500 can be implemented as application-specific circuitry or as a software module including instructions stored at a memory and executed at a processor in communication with the memory. More specifically, for example, process 500 can be implemented at a communications device within a full-duplex communications session.

A full-duplex communications session is joined at block 510 (e.g., as discussed above in relation to FIG. 4) and a conference mode is enabled at block 520. For example, a user of a communications device can navigate a user interface of the communications device and select a control to enable the conference mode. Alternatively, for example, the communications device can detect that the full-duplex communications session is (or has transitioned to) a conference communications session (e.g., a conference call) based on telephony signals and can automatically enable the conference mode.

Audio transmission from the communications device are by default disabled within the full-duplex communications session and are, therefore, disabled at block 530. That is, in the conference mode, the communications device is biased in a muted or audio transmissions inhibited state. The communications device remains in the muted state until an input signal is received at block 540. If the input signal received at block 540 is a disconnect signal (e.g., a signal from a control that indicates the user of the communications device would like to exit or disconnect from the full-duplex communications session), the full-duplex communications session is exited at block 590.

Alternatively, if the input signal received at block 540 is associated with selection of the audio transmission enable control, audio transmissions are enabled while the audio transmission enable control is selected at block 550. That is, the communications session transmits audio information associated with aural signals received at an audio input module of the communications device within the full-duplex communications session while the audio transmission enable control is selected. Process 500 returns to block 530 to disable the audio transmissions at the communications device within the full-duplex communications session in response to release (or cessation of the selection) of the audio transmission enable control.

If the input received from the user at block 540 is an aural signal, process 500 proceeds to block 560. For example, an aural signal is received from the user if the user speaks into an audio input module of the communications device. In some embodiments, aural signals with amplitudes below a threshold (or threshold value of a number of decibels) do not result in or cause the transition from block 540 to 560. That is, background aural signals or noise is ignored and only aural signals that reach a predetermined threshold result in a transition from block 540 to block 560.

The audio signal (or information derived therefrom) is compared with one or more audio signatures that define commands or keywords at the communications device. For example, the aural signal can be provided to a speech recognition module that includes audio signatures of commands and can determine whether the aural signals match or satisfy (i.e., are sufficiently similar to an audio signature that there is a high probability that the aural signals match) an audio signature. Alternatively, the audio signature can be a text description or name of a command or keyword, and the speech recognition module can determine the spelling of a word (or words) spoken by the user that generated the aural signal based on a comparison of the aural signal to a library of phonemes at (or accessible to) the speech recognition module. The spelling can then be compared with the text description to determine whether the aural signal satisfies the audio signature. If the audio signal does not satisfy the audio signature at block 560, process 500 returns to block 540 to wait for additional input signals.

If the audio signal satisfies the audio signature at block 560, the audio transmission enable control is transitioned to an audio transmission enabled state while additional aural signals are received from the audio input module of the communications device at block 570. That is, a speech recognition or detection module can be the audio transmission enable control and is in an enable audio transmission (e.g., a selected) state after a keyword or key phrase (e.g., having the audio signature) is received (and recognized) and while aural signals above a threshold to filter out or ignore background noise are received (i.e., while the user of the communications device is speaking) Thus, the audio transmission enable control can be actively selected by continuous reception of aural signals at the audio input module. This functionality is similar to a voice operated switch or exchange ("VOX") functionality of a communications device within a half-duplex communications session.

As a specific example, the user of the communications device says "speak" into a microphone of the communications device (or, for example, a headset or other accessory in communication with the communications device). A speech recognition module determines that "speak" is a keyword that enables or activates audio transmission at the communications device within the full-duplex communications session. Audio transmission remains enabled while the user continues to speak into the microphone. That is, the user selects the audio transmission enable control (e.g., a speech detection module) by speaking into the microphone.

When the aural signals are no longer received (e.g., the user stops speaking), process 500 waits at block 580 for additional aural signals. This hysteresis can be useful, for example, to prevent audio transmissions from being disabled while the user takes a breath or pauses during speech. If additional aural signals are received within the delay period at block 580, process 500 returns to block 570. Alternatively, if no aural signals (or no aural signals that are above a threshold) are received at block 580, process 500 returns to block 530 and the audio transmission enable control is transitioned to an audio transmission disabled (or inhibited) state.

Process 500 can include blocks in addition to those illustrated in FIG. 5. Additionally, one or more blocks can be rearranged. For example, a communications device can provide feedback to a user in response to detection of transitions between states of the audio transmission enable control. For example, audio feedback such as a beep or tone, visual feedback such as a flash of a light or icon at a display, haptic feedback such as brief activation of a motor or solenoid, and/or some other feedback can be provided at the communications device to alert the user to a transition between states of the audio transmission enable control. As a specific example, the communications device can provide haptic feedback to the user between blocks 560 and 570 and again between block 580 and 530. Furthermore, although process 500 is discussed above with reference to an example environment within a full-duplex communications session, process 500 is applicable within other environments.

Figure 6:
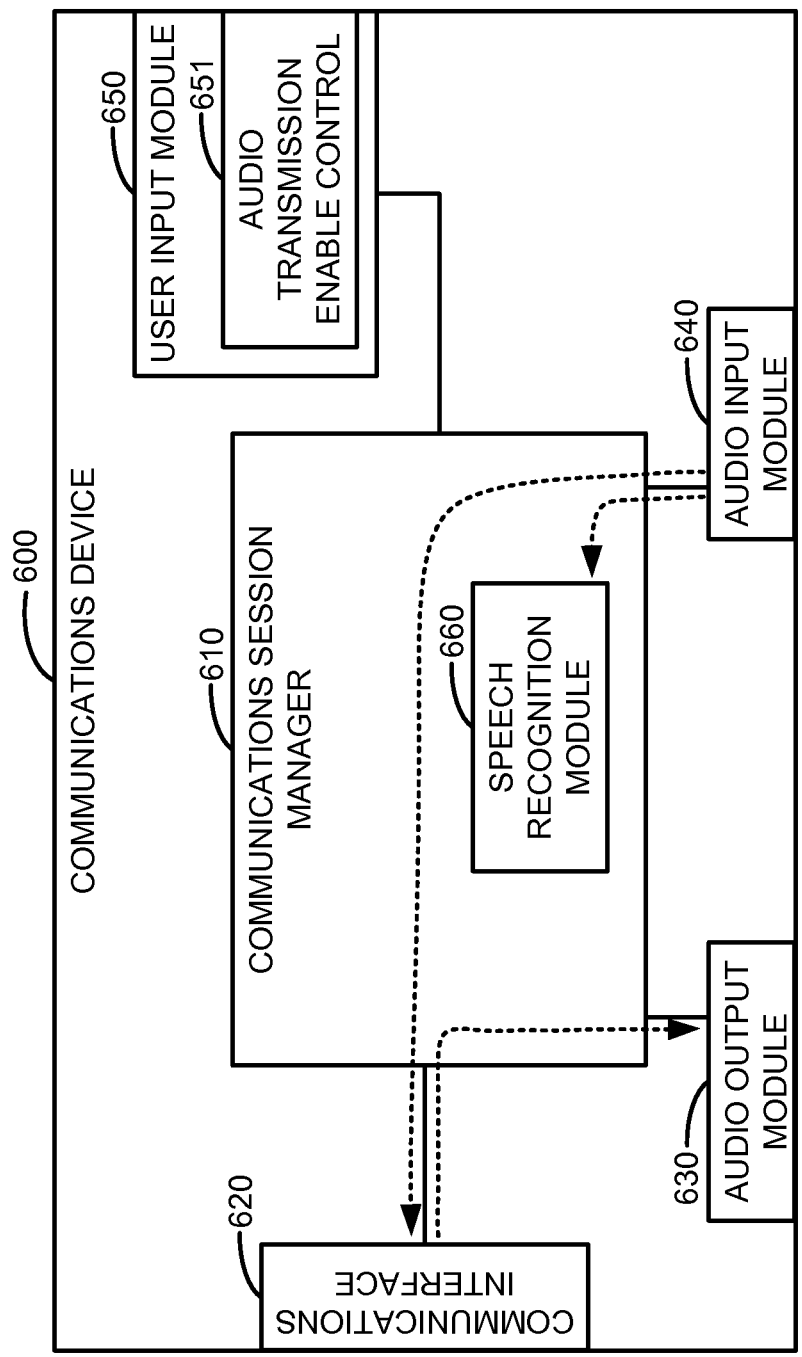
FIG. 6 is a logical schematic block diagram of a communications device, according to an embodiment.

FIG. 6 is a logical schematic block diagram of a communications device, according to an embodiment. Communications device 600 includes communications session manager 610, communications interface 620, audio output module 630, audio input module 640, user input module 650, audio transmission enable control 651, and speech recognition module 660. Communications session manager 610, communications interface 620, audio output module 630, audio input module 640, user input module 650, audio transmission enable control 651, and speech recognition module 660 are each a hardware module, a software module hosted at communications device 600, and/or a combination thereof.

Communications session manager 610 manages (or controls) participation of communications device 600 in a communications session. That is, communications session manager 610 communicates with other communications devices and/or computing devices within a communications session via communications interface 620 to support the communications session at communications device 600. For example, communications session manager 610 can exchange telephony signals (e.g., SS7 signals) with a computing device such as a telephony switch to join and/or maintain a communications session. Additionally, for example, communications session manager 610 provides audio signals received within the communications session to audio output module 630, inhibits some audio signals received from audio input module 640, and provides other audio signals (or transmits information derived from those audio signals) received from audio input module 640 to the communications session (e.g., when audio transmission enable control is in an audio transmissions enabled state).

Additionally, communications session manager 610 is operatively coupled to user input module 650. As illustrated in FIG. 6, user input module 650 includes audio transmission enable control 651. Communications session manager 610 detects the states of audio transmission enable control 651. That is, communications session manager 610 can detect (or receive) signals associated with the states or transitions between the states of audio transmission enable control 651 and can enable or disable transmission of audio signals from communications device 600 within the communications session. In some embodiments, communications session manager 610 can be operatively coupled to other controls of user input module 650 and/or other audio transmission enable controls (not shown).

Moreover, communications device 600 includes speech recognition module 660. Speech recognition module 660 can be included within communications session manager 610 as illustrated in FIG. 6 or can be separate from communications session manager 610. As discussed above, speech recognition module 660 can determine whether aural signals received from audio input module 640 satisfy a command or keyword in response to which communications session manager 610 enables audio transmissions within the communications session. Furthermore, speech recognition module 660 can determine that aural signals are subsequently received at audio input module 640 and provide one or more signals to communications session manager 610 that indicate that audio transmissions should remain enabled. For example, in response to the user of communications device 600 speaking Moreover, speech recognition module 660 can determine that aural signals are no longer received at audio input module 640 and provide one or more signals to communications session manager 610 that indicate that audio transmissions should be disabled. For example, in response to the user of communications device 600 no longer speaking That is, speech recognition module 660 can be an audio transmission enable control. In some embodiments, speech recognition module 660 can determine whether aural signals received from audio input module 640 satisfy a command or keyword in response to which communications session manager 610 disables audio transmissions within the communications session.

Thus, communications device 600 can include more than one audio transmission enable control. Communications session manager 610 can enable audio transmission within the communications session when one audio transmission enable control, multiple audio transmission enable controls, or all audio transmission enable controls of communications device 600 are in an audio transmission enabled state. Accordingly, in various embodiments, one audio transmission enable control, multiple audio transmission enable controls, or all audio transmission enable controls of communications device 600 should be in an audio transmission enabled to enable audio transmissions within a communications session.

Some embodiments include a processor and a related processor-readable medium having instructions or computer code thereon for performing various processor-implemented operations. Such a processor can be a general-purpose processor or an application-specific process and can be implemented as a hardware module and/or a software module. A hardware module can be, for example, a microprocessor, a microcontroller, an application-specific integrated circuit ("ASIC"), a programmable logic device ("PLD") such as a field programmable gate array ("FPGA"), and/or other electronic circuits that perform operations. A software module can be, for example, instructions, commands, and/or codes stored at a memory and executed at another processor. Such a software module can be defined using one or more programming languages such as Java™, C++, C, an assembly language, a hardware description language, and/or another suitable programming language. For example, a processor can be a virtual machine hosted at a computer server including a microprocessor and a memory.

In some embodiments, a processor can include multiple processors. For example, a processor can be a microprocessor including multiple processing engines (e.g., computation, algorithmic or thread cores). As another example, a processor can be a computing device including multiple processors with a shared clock, memory bus, input/output bus, and/or other shared resources. Furthermore, a processor can be a distributed processor. For example, a processor can include multiple computing devices, each including a processor, in communication one with another via a communications link such as a computer network.

Examples of processor-readable media include, but are not limited to: magnetic storage media such as a hard disk, a floppy disk, and/or magnetic tape; optical storage media such as a compact disc ("CD"), a digital video disc ("DVDs"), a compact disc read-only memory ("CD-ROM"), and/or a holographic device; magneto-optical storage media; non-volatile memory such as read-only memory ("ROM"), programmable read-only memory ("PROM"), erasable programmable read-only memory ("EPROM"), electronically erasable read-only memory ("EEPROM"), and/or FLASH memory; and random-access memory ("RAM"). Examples of computer code include, but are not limited to, micro-code or micro-instructions, machine instructions, such as produced by a compiler, and files containing higher-level instructions that are executed by a computer using an interpreter. For example, an embodiment may be implemented using Java™, C++, or other object-oriented programming language and development tools. Additional examples of computer code include, but are not limited to, control signals, encrypted code, and compressed code.

Figure 7:
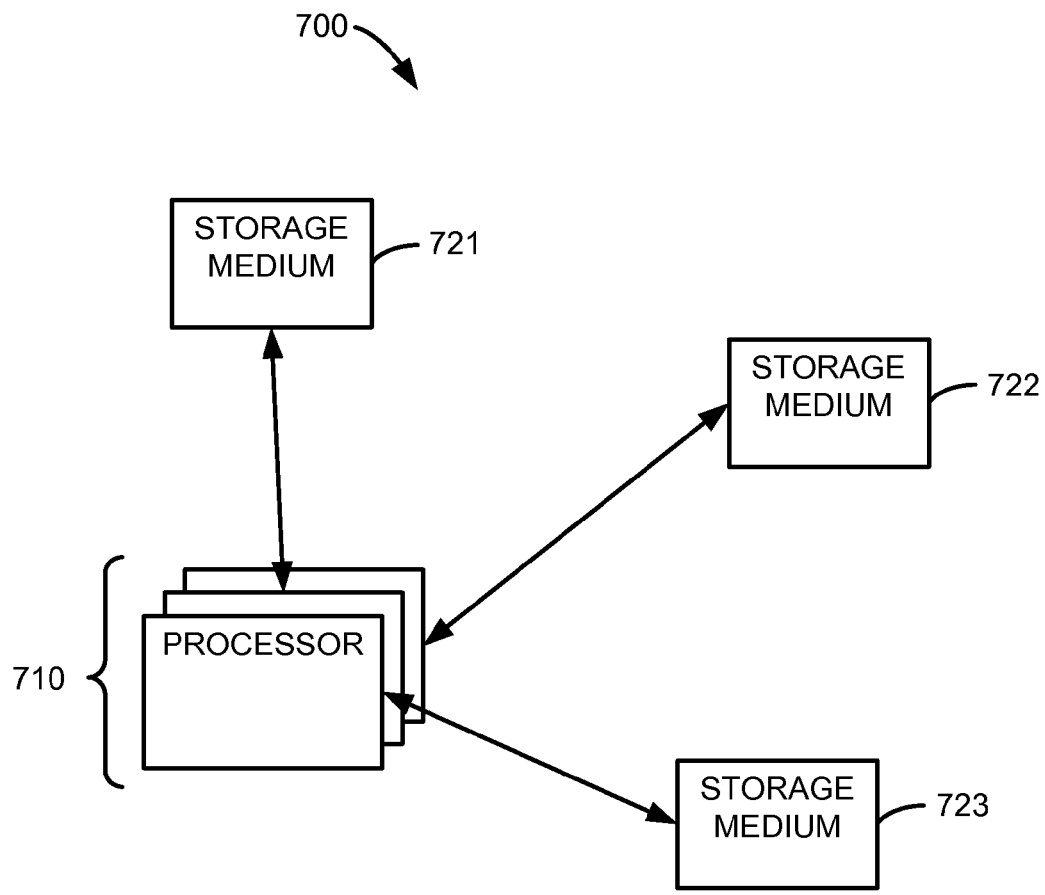
FIG. 7 is a schematic block diagram of a system including a processor and storage media, according to an embodiment.

As an example of a system including one or more processors and processor-readable storage media, FIG. 7 is a schematic block diagram of system 700 including a processor and storage media, according to an embodiment. As illustrated in FIG. 7, system 700 includes one or more processors 710 operatively coupled to storage medium 721, storage medium 722, and storage medium 723. One or more processors 710 can access instructions or code at storage medium 721, storage medium 722, and storage medium 723. Storage media 721, 722, and 723 can be any processor-readable media and/or related devices to access processor-readable media. For example, storage medium 721 can be a hard disk drive including a magnetic storage medium, storage medium 722 can be an optical drive such as a DVD drive and can accept DVD storage media on which processor-readable instructions can be stored, and storage medium 723 can be a FLASH memory drive with a Universal Serial Bus ("USB") interface. In some embodiments, storage media 721, 722, and/or 723 can be local to (e.g., coupled to a common computing device) one or more processors 710. In some embodiments, storage media 721, 722, and/or 723 can be remote from (e.g., coupled to a separate computing device) one or more processors 710 and in communication with one or more processors 710 via communications link. Furthermore, one or more of storage media 721, 722, and/or 723 can be local to one or more processors 710 and one or more of the remaining of storage media 721, 722, and/or 723 can be remote from one or more processors 710. For example, one or more processors 710 can be included within a communications device such as a cellular telephone and storage medium 7721 can be a data store from which over-the-air ("OTA") updates are received (in either a push model or pull model) by the communications device.

As a more specific example, one or more processors 710 can be included within a computing device such as a communications device having an internal solid-state data store represented by storage medium 721 and a removable solid-state data store such as a Secure Digital High-Capacity ("SDHC") memory card represented by storage medium 722. The computing device can also include a USB host controller to communicate with a USB FLASH memory drive represented by storage medium 723. One or more processors 710 can access processor-readable instructions such as processor-readable instructions that implement an operating system, software application, and/or one or more processes at any of storage media 721, 722, and/or 723. Said differently, one or more processors 710 can interpret or execute instructions at processor-readable media via storage medium 721, storage medium 722, and/or storage medium 723. In some embodiments, system 700 can include one or more memories such as RAM that function as a cache between one or more of storage medium 721, storage medium 722, and/or storage medium 723 and one or more processors 710 for instructions or code stored (or accessible) at one or more of storage medium 721, storage medium 722, and/or storage medium 723.

While certain embodiments have been shown and described above, various changes in form and details may be made. For example, some features of embodiments that have been described in relation to one embodiment and/or process can be useful to other embodiments. In other words, processes, features, and/or properties of various embodiments (e.g., a process performed or a feature existing at) described in relation to one embodiment can be related to other embodiments. Furthermore, it should be understood that the systems and methods described herein can include various combinations and/or sub-combinations of the components and/or features of the different embodiments described. Thus, features described with reference to one or more embodiments can be combined with other embodiments described herein.

What is claimed is:

1. A method to disable audio transmission within a full-duplex communications session, comprising:
   joining the full-duplex communications session;
   disabling, at a first time, audio transmission within the full-duplex communications session;
   detecting, at a second time after the first time, that an audio transmission enable control is in a first state;
   enabling audio transmission within the full-duplex communications session in response to the detecting that the audio transmission enable control is in the first state;
   detecting, at a third time after the second time, that the audio transmission enable control is in a second state; and
   disabling audio transmission within the full-duplex communications session in response to the detecting that the audio transmission enable control is in the second state.

2. The method of claim 1, wherein the audio transmission enable control is a physical control biased in the second state.

3. The method of claim 1, wherein:
   the audio transmission enable control is a physical button that is biased in the second state;
   the first state is a depressed state of the physical button; and
   the second state is a released state of the physical button.

4. The method of claim 1, wherein:
   the audio transmission enable control is a virtual button that is biased in the second state;
   the first state is a selected state of the virtual button; and
   the second state is a released state of the virtual button.

5. The method of claim 1, wherein the audio transmission enable control is biased in the second state, the method further comprising:
   selecting a control from a plurality of controls as the audio transmission enable control in response to input from a user.

6. The method of claim 1, further comprising:
   determining, before the first time, that the full-duplex communications session is a full-duplex conference communications session, the disabling audio transmission at the first time being in response to the determining that the full-duplex communications session is a full-duplex conference communications session.

7. A non-transitory processor-readable medium storing code representing instructions to cause a processor to perform a process, the process comprising:
   joining a full-duplex communications session including a plurality of communication devices;
   inhibiting audio transmission at a first time;
   detecting a first signal associated with a transition of an audio transmission enable control from a first state to a second state;
   enabling audio transmission in response to the first signal;
   detecting a second signal associated with a transition of the audio transmission enable control from the second state to a first state, the transition of the audio transmission enable control from the second state to a first state being a complementary transition of the transition of the audio transmission enable control from the first state to the second state; and
   inhibiting audio transmission in response to the second signal at a second time after the first time.

8. The non-transitory processor-readable medium of claim 7, wherein the audio transmission enable control is a physical control biased in the first state.

9. The non-transitory processor-readable medium of claim 7, wherein:
   the audio transmission enable control is a virtual button that is biased in the first state;
   the first state is a released state of the virtual button; and
   the second state is a selected state of the virtual button.

10. The non-transitory processor-readable medium of claim 7, wherein the audio transmission enable control is biased in the first state, the process further comprising:
   designating, in response to input from a user, a control from a plurality of controls as the audio transmission enable control.

11. The non-transitory processor-readable medium of claim 7, the process further comprising:
   determining, before the first time, that the full-duplex communications session is a full-duplex conference communications session, the disabling audio transmission at the first time being in response to the determining that the full-duplex communications session is the full-duplex conference communications session.

12. The non-transitory processor-readable medium of claim 7, the process further comprising:
   receiving an audio signal;
   determining that the audio signal satisfies an audio signature; and
   transitioning the audio transmission enable control from the first state to the second state in response to the determining.

13. The non-transitory processor-readable medium of claim 7, the code further comprising code to:

receive a first audio signal;

determine that the first audio signal satisfies an audio signature;

transition the audio transmission enable control from the first state to the second state in response to the determining;

receive a plurality of audio signals after transitioning the audio transmission enable control from the first state to the second state; and transition the audio transmission enable control from the second state to the first state after expiry of a predetermined period following a last audio signal from the plurality of audio signals.

14. A system to disable audio transmission within a full-duplex communications session, comprising:

an audio input module to receive audio signals;

an audio output module to generate audio signals;

a user input module; and a communications session manager operatively coupled to the audio input module, the audio output module, and the user input module and operable to:

manage the full-duplex communications session, inhibit audio signals received via the audio input module from the communications session following a determination that an audio transmission enable control at the user input module is in a biased state, and provide audio signals received via the audio input module to the communications session following a determination that the audio transmission enable control at the user input module is in an unbiased state.

15. The system of claim 14, wherein:

the audio transmission enable control is a button;

the biased state is a released state; and the unbiased state is a selected state.

* * * * *

UNITED STATES PATENT AND TRADEMARK OFFICE
CERTIFICATE OF CORRECTION

| | | |
|---|---|---|
| PATENT NO. | : 8,837,713 B2 | Page 1 of 1 |
| APPLICATION NO. | : 13/879899 | |
| DATED | : September 16, 2014 | |
| INVENTOR(S) | : Diptesh Patil | |

It is certified that error appears in the above-identified patent and that said Letters Patent is hereby corrected as shown below:

In the Claims

In column 18, line 29, in Claim 7, delete "transition of the transition" and insert -- transition --, therefor.

Signed and Sealed this
Seventeenth Day of February, 2015

Michelle K. Lee
*Deputy Director of the United States Patent and Trademark Office*